United States Patent Office 3,814,710
Patented June 4, 1974

3,814,710
POLISH COMPOSITIONS
David Gray Duncan, Newfarmloch, Scotland, assignor to Imperial Chemical Industries Limited, London, England
No Drawing. Continuation of application Ser. No. 298,391, Oct. 17, 1972, which is a continuation of application Ser. No. 102,070, Dec. 28, 1970, both now abandoned. This application Sept. 27, 1973, Ser. No. 401,376
Claims priority, application Great Britain, Jan. 14, 1970, 1,835/70
Int. Cl. C08g 51/52
U.S. Cl. 260—28                                   9 Claims

ABSTRACT OF THE DISCLOSURE

Improved weather and detergent resistant polish especially for motor cars, consisting of the conventional constituents with a proportion of a hydroxy-ended organopolysiloxane and an aminoalkoxysiloxane catalyst therefor and with or without a proportion of a silicone fluid as used hitherto.

---

This is a continuation of application Ser. No. 298,391 filed Oct. 17, 1972, now abandoned, which is a continuation of Ser. No. 102,070, filed Dec. 28, 1970, now abandoned.

This invention relates to new and improved polish compositions and more particularly to such compositions containing a proportion of one or more organopolysiloxanes.

Polish compositions based on waxes dissolved in a solvent or in the form of an aqueous emulsion are well known and have been widely used. Many of these compositions have had incorporated therein a proportion of a liquid linear organopolysiloxane. They have, of course, also contained in varying proportions a wide variety of other additives. Similar compositions not containing any wax have also been widely used. We have now found, however, that polish compositions which when applied are more resistant to the action of weathering and detergents, can be obtained by the incorporation therein of certain specific types of organopolysiloxanes.

According to the present invention a new and improved polish composition comprises 0 to 15 percent by weight of wax, 1 to 6 percent by weight of a hydroxy-ended polydiorganosiloxane of viscosity not greater than 10,000 cs. at 25° C., 0 to 6 percent by weight on total of one or more other linear organopolysiloxanes, 0.01 to 4.0 percent by weight of an aminoalkoxypolysiloxane as hereinafter defined, 0 to 5 percent by weight of an emulsifying agent, 0 to 5 percent by weight of a thickening agent, 0 to 15 percent by weight of a finely divided abrasive material, 2 to 90 percent by weight of a hydrocarbon or halogenated hydrocarbon solvent and 0 to 90 percent by weight of water.

Any of the waxes hitherto used for polish compositions may be used in the compositions of our invention if a wax is to be included. These include, for example, montan wax, carnauba, candellilla, ouricury, beeswax and synthetic waxes such as ozokerite, polyethylene waxes and the paraffin waxes, including microcrystalline and oxidized paraffins. In general it is preferred that a wax be present in amount from 2 to 10 percent by weight. It will, of course, be apparent that not all of the wax need be only of one kind in any specific composition.

The hydroxy-ended polydiorganosiloxane may be, for example, of viscosity from 300 to 10,000 cs. at 25° C. It is, however, frequently preferred that it be of viscosity from 2,000 to 5,000 cs. at 25° C.

The hydroxy-ended polydiorganosiloxane, while consisting essentially of diorganosiloxanyl units, may also contain a small proportion of trifunctional silicon atoms attached to a single organo group provided the amount of such is not sufficient to destroy the solubility of the polydiorganosiloxane in the chosen organic solvent. The organo groups therein may be alkyl, aryl, aralkyl, alkaryl, alkenyl, cycloalkyl or cycloalkenyl groups or such groups containing a variety of substituents such as halogens or cyano groups. Suitable groups include, for example, methyl, ethyl, phenyl, vinyl, cyclohexyl, 3,3,3-trifluoropropyl and chlorophenyl groups. In many cases it is preferred that at least the major proportion, and in some cases all, of the organo groups are methyl groups.

It is, for many purposes, preferred that the hydroxy-ended polydiorganosiloxane be present in amount from 2 to 5 percent by weight.

By the term "aminoalkoxysiloxane" as used herein we mean an organopolysiloxane having one or more of the groups ($R^4R^5N.R^8$—) attached to one or more silicon atoms through an oxygen atom, where $R^8$ is an alkylene group or consists of alkylene groups joined by one or more —$NR^6$— groups or oxygen atoms, the oxygen atom attached to silicon and the essential nitrogen atom each being attached to different carbon atoms and $R^4$ and $R^5$, which may or may not be the same, are hydrogen or alkyl, cycloalkyl, aminoalkyl or hydroxyalkyl groups, monovalent groups consisting of alkylene and alkyl groups joined by one or more —$NR^6$— groups or oxygen atoms or alternatively $R^4$ and $R^5$ together form a single alkylene group or a group consisting of alkylene groups joined by one or more —$NR^6$— groups or oxygen atoms and $R^6$ is hydrogen or an alkyl group having not more than 5 carbon atoms. It is preferred that $R^8$ be —$CH_2CH_2$— or —$CH_2CH(Et)$— and that $R^4$ and $R^5$ be hydrogen, methyl or ethyl groups. Because of low cost and availability, the more generally preferred groups are $NH_2CH_2CH_2$—, $MeNHCH_2CH_2$— and $Me_2NCH_2CH_2$—.

Suitable groups which may be attached to a silicon atom through an oxygen atom to form the aminoalkoxysiloxanes include, for example,

—$CH_2CH_2NH_2$, —$CH_2CH_2NH.CH_3$, —$CH_2CH_2N(CH_3)_2$,

—$CH_2CH_2N(C_2H_5)_2$, —$CH_2CH_2CH_2NH_2$, —$CH_2CH(CH_3)NH_2$,

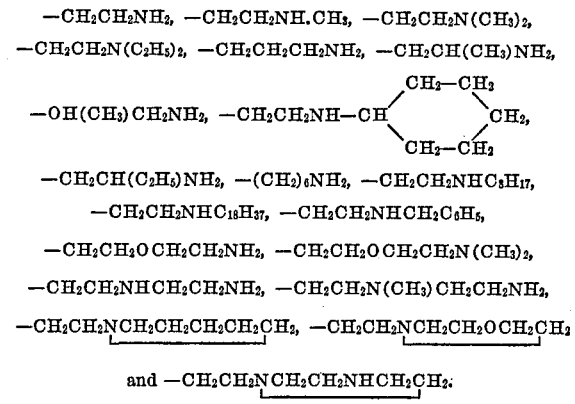

—$CH_2CH(C_2H_5)NH_2$, —$(CH_2)_6NH_2$, —$CH_2CH_2NHC_8H_{17}$,

—$CH_2CH_2NHC_{18}H_{37}$, —$CH_2CH_2NHCH_2C_6H_5$,

—$CH_2CH_2OCH_2CH_2NH_2$, —$CH_2CH_2OCH_2CH_2N(CH_3)_2$,

—$CH_2CH_2NHCH_2CH_2NH_2$, —$CH_2CH_2N(CH_3)CH_2CH_2NH_2$,

—$CH_2CH_2\underline{NCH_2CH_2CH_2CH_2CH_2}$, —$CH_2CH_2\underline{NCH_2CH_2OCH_2CH_2}$ and —$CH_2CH_2\underline{NCH_2CH_2NHCH_2CH_2}$.

Suitable aminoalkoxysiloxanes include, for example,

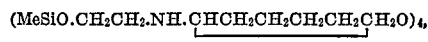

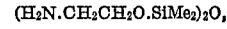

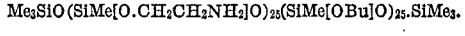

The preferred aminoalkoxysiloxanes are these of average general formula

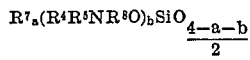

where $R^7$ is a hydrocarbyl or hydrocarbyloxy group, $R^8$, $R^4$ and $R^5$ are as defined above, $a$ is any number from 1.0 to 1.8, $b$ is any number from 0.3 to 1, $a+b$ is not less than 2, and the total number of carbon atoms in the groups $R^8$, $R^4$, $R^5$ and $R^7$ together is not greater than 24. The group $R^7$ may be alkyl, aryl, aralkyl, alkaryl, alkenyl, alkoxy, aralkyloxy or such groups containing substituents. Suitable groups include, for example, methyl, ethyl, vinyl, phenyl, chlorophenyl, fluoropropyl, benzyl, tolyl, methoxy, ethoxy, butoxy and phenoxy groups.

In general, the most preferred aminoalkoxysiloxanes are the methyl(aminoethoxy)polysiloxanes, i.e. $R^7$ is a methyl group. It is also preferred that each silicon atom, other than those terminating a chain, each have one aminoethoxy and one methyl group attached thereto.

In general it is preferred that the aminoalkoxysiloxane be present in amount from 0.01 to 0.5 percent by weight. It has been found desirable with certain of the aminoalkoxysiloxanes which are only partially soluble in the aliphatic solvent commonly used in polish compositions to react them with carboxylic acids of the general formula $R^v$COOH, where $R^v$ is an alkyl group having at least 6 carbon atoms, to give the salt of the aminoalkoxysiloxane. The ratio of equivalent weights of acid to aminoalkoxysiloxane may vary, for example, from 1:1 to 10:1.

The compositions of our invention may, if desired, also contain up to 6 percent by weight of one or more of any of the linear organopolysiloxanes hitherto used in wax polish compositions. If any other such organopolysiloxane is used it is preferably present in amount from 0.1 to 3 percent by weight. These are normally of viscosity from 100 to 30,000 cs. at 25° C. It is generally preferred that it be a trimethylsilyl-ended polydimethylsiloxane.

If necessary, our compositions may contain up to 5 percent by weight of an emulsifying agent. The need for this will depend on the nature of the constituents and whether the composition is to be a solvent dispersion or an emulsion. Any of the hitherto used emulsifying agents may be used such as, for example, morpholine oleate, triethanolamine stearate, amine acetates, sorbitan fatty acid esters, the alkylaryl polyether alcohols and the ethylene oxide condensation products of alkylated phenols.

If desired, one or more of the conventional thickening agents may be present. These are, of course, not necessary where the composition is a solvent dispersion. Among the thickening agents which may be used are, for example, sodium carboxymethyl cellulose and carboxy vinyl polymers such as the methyl vinyl ether maleic anhydride resins and ethylene maleic anhydride resins.

The compositions of our invention may contain any of the finely divided abrasive materials hitherto used in wax polish compositions. These include, for example, diatomaceous earths, Neuberg chalk, amorphous silica and aluminium silicates. Generally, amounts from about 8 to about 13 percent by weight are preferred when an abrasive is incorporated.

Hydrocarbon solvents which may be used in our compositions include, for example, petroleum fractions such as petroleum naphtha, kerosene and white spirit. Suitable halogenated hydrocarbon solvents include, for example, carbon tetrachloride, perchlorethylene, trichlorethylene and 1,1,2-trichlorethane. The amount of solvent used will, of course, depend on the proportions of solids present and on the consistency desired and hence may vary widely. Thus, in a composition which is a solvent dispersion no water is present, while in a water-based emulsion water may be present in amount up to about 90 percent.

Our invention is further illustrated by the following examples in which all parts and percentages are by weight.

EXAMPLE 1

A water-based emulsion car polish was prepared by
(a) Heating together

| | Parts |
|---|---|
| Carnauba wax | 3.5 |
| Paraffin wax (140/145° F.) | 0.66 |
| Hydroxy-ended polydimethylsiloxane (viscosity 3,500 cs. at 25° C.) | 3.0 |
| Trimethylsilyl-ended polymethyl (aminoethoxy) siloxane (having on average 50 silicon atoms in the chain) | 0.06 |
| Octoic acid | 0.18 |
| Trimethylsilyl-ended polydimethylsiloxane (viscosity 1,000 cs. at 25° C.) | 1.0 |
| Oleic acid | 2.5 |
| White spirit | 25.0 |

(b) Adding to the heated mixture while stirring

| | Parts |
|---|---|
| Water | 52.6 |
| Morpholine | 1.5 |

(c) Adding 10 parts of diatomaceous earth abrasive and sufficient 25 percent aqueous ammonium hydroxide solution to bring the pH of the composition to 8.5 and
(d) Homogenizing the mixture to a smooth cream.

The product so obtained gave when applied to a surface a detergent-resistant, high gloss polish.

EXAMPLE 2

A paste car wax was prepared by blending together

| | Parts |
|---|---|
| Montan wax blend | 13 |
| Hydroxy-ended polydimethylsiloxane (viscosity 3,500 cs. at 25° C. | 4 |
| Trimethylsilyl-ended polymethyl(N,N-dimethylaminoethoxy)siloxane (having an average 50 silicon atoms in the chain) | 0.1 |
| Diatomaceous earth | 11 |
| White spirit | 71.9 |

An 18″ x 18″ mild steel panel coated with a black nitrocellulose car finish was cleaned thoroughly with a solvent/abrasive mixture in order to obtain a dirt-free, dulled finish.

Four proprietary brands of car polish, two paste products and two liquid products designated A, B, C and D, and a sample of the product of Example 1(E), were applied to the panel side by side. They were polished in turn with cheesecloth until maximum gloss possible was obtained. It was immediately apparent that the area coated with product had the highest visual gloss. (Visual comparison of gloss by the human eye, although subjective, is recognized in the polish industry as the most reliable method of testing polish gloss.)

After allowing the polishes to age for 24 hours the detergent resistance of the polishes was tested. A 1 percent aqueous solution of a common household detergent was applied by cloth to the plate which was then scrubbed as uniformly as possible with a circular motion for 30 seconds. It was then rinsed with cold water, dried and scrubbed again. The cycle was repeated until all the polishes were effectively removed from the panel. The recorded results were as follows:

| Polish: | Number of washes required before complete removal |
|---|---|
| A (paste) | 7 |
| B (paste) | 6 |
| C (liquid) | 5 |
| D (liquid) | 5 |
| E (liquid) | 14 |

In a second series of tests, polish $E^1$ was made up. This was similar to E but the hydroxy-ended siloxane and aminoalkoxysiloxane were omitted and replaced by white spirit. Product F, that of Example 2, was also evaluated. The results were as follows:

| Polish: | Number of washes required before complete removal |
|---|---|
| E (liquid) | 14 |
| E¹ (liquid) | 6 |
| F (paste) | 15 |

EXAMPLE 3

A hard paste wax polish was prepared by blending together

| | Parts |
|---|---|
| Montan wax blend | 10.0 |
| Hydroxy - ended polydimethylsiloxane (viscosity 10,000 cs. at 25° C.) | 2.94 |
| Trimethylsilyl-ended methyl(N,N - dimethylaminoethoxy)siloxane (having on average 50 silicon atoms in the chain) | 0.06 |
| Trimethylsilyl-ended polydimethylsilane (viscosity 500 cs. at 25° C.) | 2.0 |
| Aluminium silicate | 11.0 |
| White spirit | 60.0 |
| Kerosene | 14.0 |

This polish was tested in the manner described in Example 2 and was found to give results similar to the product of that Example.

EXAMPLE 4

A polish similar to that of Example 3 was made up in which the hydroxy-ended polydimethylsiloxane was replaced by one having a viscosity of 2,000 cs. at 25° C. and the aminoalkoxysiloxane had the average formula $Me_3SiO[SiMe(OCH_2CH_2CH_2NH_2)O]_{50}SiMe_3$. This was found on testing to give results similar to the product of Example 3.

EXAMPLE 5

A water in oil emulsion polish was prepared by
(a) Heating together

| | Parts |
|---|---|
| Bleached montan wax | 4.0 |
| Oxidized microcrystalline wax | 3.0 |
| Hydroxy - ended polydimethylsiloxane (viscosity 5,000 cs. at 25° C.) | 2.94 |
| Trimethylsilyl - ended methyl(aminopropoxy)siloxane (having on average 50 silicon atoms in the chain) | 0.06 |
| Sorbitan sesquioleate | 1.6 |
| White spirit | 38.4 |

(b) Adding to the heated mixture while stirring

| | Parts |
|---|---|
| Water | 40.0 |
| Aluminium silicate | 10.0 | and homogenizing the product.

Testing of this polish in the manner described in Example 2 gave results similar to the product of that Example.

EXAMPLE 6

A polish was made up identical to that of Example 5 except that the aminoalkypolysiloxane had the average formula $Me_3SiO[SiMe(OCH_2CH_2OCH_2CH_2N(CH_3)_2)O]_{50}SiMe_3$ Testing of this product gave results similar to the product of Example 5.

What I claim is:

1. A polish composition consisting essentially of 2 to 15 percent by weight of wax, 1 to 6 percent by weight of a hydroxy-ended polydiorganosiloxane of viscosity not greater than 10,000 cs. at 25° C., 2 to 6 percent by weight in total of one or more other linear organopolysiloxanes, 0.01 to 4.0 percent by weight of an aminoalkoxysiloxane having the average general formula

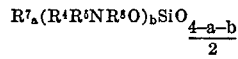

where $R^4$ and $R^5$ are each selected from the group consisting of hydrogen and alkyl, cycloalkyl, aminoalkyl and hydroxyalkyl groups, monovalent groups consisting of alkylene and alkyl groups joined by one or more —NR⁶— groups or oxygen atoms, $R^6$ being selected from the group consisting of hydrogen and alkyl groups having not more than 5 carbon atoms, and groups which together form a single alkylene group or a group consisting of alkylene groups joined by one or more —NR⁶— groups or oxygen atoms and $R^8$ is selected from the group consisting of alkylene groups and alkylene groups joined by one or more —NR⁶— groups or oxygen, $R^7$ is selected from the group consisting of hydrocarbyl and hydrocarbyloxy groups, $a$ is a number from 1.0 to 1.8, $b$ is a number from 0.3 to 1, $a+b$ is not less than 2 and the total number of carbon atoms in the groups $R^4$, $R^5$, $R^7$ and $R^8$ together is not greater than 24, the remaining organo groups in the various siloxanes being selected from the group consisting of alkyl, aryl, aralkyl, alkaryl, alkenyl, cycloalkyl and cycloalkenyl groups with or without substituents selected from the group consisting of halogens and cyano groups, 0 to 5 percent by weight of an emulsifying agent, 0 to 5 percent by weight of a thickening agent, 0 to 15 percent by weight of a finely divided abrasive material, 2 to 90 percent by weight of a solvent selected from the group consisting of hydrocarbons and halogenated hydrocarbon and 0 to 90 percent by weight of water.

2. A composition according to claim 1 wherein the hydroxy-ended polydiorganosiloxane is of viscosity from 2,000 to 5,000 cs. at 25° C.

3. A composition according to claim 1 wherein at least a major proportion of the organo groups in the hydroxy-ended polydiorganosiloxane are methyl groups.

4. A composition according to claim 1 wherein the hydroxy-ended polydiorganosiloxane is present in amount from 2 to 5 percent by weight.

5. A composition according to claim 1 wherein in the aminoalkoxypolysiloxane the groups $R^8$ are selected from the group consisting of —CH₂CH₂— and —CH₂CH(Et)— groups and the groups $R^4$ and $R^5$ are selected from the group consisting of hydrogen, methyl and ethyl groups.

6. A composition according to claim 5 wherein the group $R^4R^5NR^8$ is selected from the group consisting of NH₂CH₂CH₂—, MeNHCH₂CH₂— and Me₂NCH₂CH₂—.

7. A composition according to claim 6 wherein the aminoalkoxysiloxane is a methyl(aminoethoxy)polysiloxane.

8. A composition according to claim 1 wherein the aminoalkoxysiloxane is present in amount from 0.01 to 0.5 percent by weight.

9. A composition according to claim 1 wherein there is present one or more linear organopolysiloxanes and the said linear organopolysiloxanes are trimethylsilyl-ended polydimethylsiloxanes.

References Cited

UNITED STATES PATENTS 3,524,900   8/1970   Gibbon  260—825

ALLAN LIEBERMAN, Primary Examiner

P. R. MICHL, Assistant Examiner

U.S. Cl. X.R.

106—10; 260—29.2 M, 33.6 SB, 33.8 SB, 825